US012447497B2

(12) United States Patent
Childs

(10) Patent No.: US 12,447,497 B2
(45) Date of Patent: Oct. 21, 2025

(54) CAULKING GUN LOAD SENSITIVE VARIABLE RATIO DRIVE DEVICE

(71) Applicant: Larry Childs, Rohnert Park, CA (US)

(72) Inventor: Larry Childs, Rohnert Park, CA (US)

(73) Assignee: DRIPLESS, INC., Rohnert Park, CA (US)

( * ) Notice: Subject to any disclaimer, the term of this patent is extended or adjusted under 35 U.S.C. 154(b) by 0 days.

(21) Appl. No.: 18/931,552

(22) Filed: Oct. 30, 2024

(65) Prior Publication Data

US 2025/0050373 A1 Feb. 13, 2025

(51) Int. Cl.
*B05C 17/005* (2006.01)
*B05C 17/01* (2006.01)

(52) U.S. Cl.
CPC ................................ *B05C 17/0126* (2013.01)

(58) Field of Classification Search
CPC ................ B05C 17/0123; B05C 17/01; B05C 17/00506; B05C 17/00593; B67D 1/0024; B67D 1/0037; B67D 2210/00031; Y10T 74/1598; Y10T 74/1553; G01F 11/026
USPC .......................................................... 222/391
See application file for complete search history.

(56) References Cited

U.S. PATENT DOCUMENTS 2,367,346 A * 1/1945 Good .................. B05C 17/0123 222/391
2,892,457 A * 6/1959 Sturtz ............... A61M 5/31581 222/391
4,457,712 A * 7/1984 Dragan ............. B05C 17/00596 222/391
4,637,745 A * 1/1987 Speisebecher ...... B05C 17/0053 401/2
4,776,490 A * 10/1988 Wingert .............. B05C 17/0053 226/127
5,248,068 A * 9/1993 Goergen ........... B05C 17/00553 222/326
5,431,654 A * 7/1995 Nic ....................... G01F 11/026 606/92
5,955,114 A * 9/1999 Llanos .................. G01F 11/026 222/391
6,325,249 B1 * 12/2001 Keller ............... B05C 17/00553 222/326
6,325,261 B1 12/2001 Webber
6,460,736 B1 * 10/2002 D'Agostino ...... B05C 17/00533 222/391

(Continued)

*Primary Examiner* — Charles P. Cheyney
(74) *Attorney, Agent, or Firm* — Steven A. Nielsen; www.NielsenPatents.com

(57) ABSTRACT

Disclosed systems provide cost effective dispensers of construction sealant, sausage tubes and other products having varied and even unknown levels of viscosity. A variable ratio drive cam pivots in response to the trigger tension caused by the viscosity of the material to be dispensed. In a relative high force mode, encountered with high viscosity payloads, the drive cam slightly pivots, keeping the distance traveled by the drive rod relatively small in response to a pull of the trigger. This results in a relatively high thrust ratio. Conversely, in dispensing a product with a relatively low viscosity, the drive cam pivots by a greater degree, causing a longer movement of the drive rod in response to the distance traveled by the trigger resulting in a lower thrust ratio. The system works well in caulking guns, bulk loading tools and multi tube tools, such that multiple tools are not required.

9 Claims, 5 Drawing Sheets

(56) References Cited

U.S. PATENT DOCUMENTS

| | | | | |
|---|---|---|---|---|
| 7,032,786 | B1 * | 4/2006 | Huang ................ B05C 17/0123 604/209 | |
| 7,420,341 | B2 | 9/2008 | Glasgow et al. | |
| 8,387,825 | B2 | 3/2013 | Herman et al. | |
| 8,424,727 | B2 | 4/2013 | Herman et al. | |
| 11,938,092 | B1 * | 3/2024 | DeWoolfson ......... A61J 1/2093 | |
| 2004/0195271 | A1 * | 10/2004 | Chen ....................... B05C 17/01 222/380 | |

* cited by examiner

CAULKING GUN LOAD SENSITIVE VARIABLE RATIO DRIVE DEVICE

RELATED PATENT APPLICATION AND INCORPORATION BY REFERENCE

NA

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to sealant application tools. More particularly, the invention relates to the dynamic adjustment of force to comport with the viscosity of the material being applied.

(2) Description of the Related Art

Caulking guns or sealant application tools and generally known in the related art. They primarily consist of a frame to contain a tube of sealant and a fixed trigger system that pushes a drive rod behind the tube to expel the sealant out of the tube. Thus, in the prior art, the force required to move the drive rod or ratio of trigger movement to rod movement does not change even though a caulking gun may be used for expelling sealant of various viscosities.

Thus, in the prior art, a sealant with a relatively low viscosity will require a relatively lower trigger effort and result in a relatively higher rate of flow, which makes the precise and even placement of the sealant difficult. The user may not be accustomed to a relatively large amount of sealant being expelled with a relatively low force applied to the trigger. Transversely, a user transitioning from applying a tube of sealant with a relatively low viscosity to a sealant with a relatively high viscosity will need to apply greater pressure upon the trigger and will achieve a slower rate of output. The higher hand pressure upon the trigger needed to move the drive rod often results in the user's hand shaking, which degrades the quality of the application.

Caulking guns are traditional made with a very simple design such that they are sometimes considered disposable. Very few improvements have been made to mechanical caulk guns over the years. In the known prior art, mechanical caulking guns have one set thrust ratio.

The prior art attempts to provide appropriate caulking guns to comport with sealants of different viscosities by providing separate caulking guns with different thrust ratios. A thrust ratio may be considered to be the ratio of force, work or distance of travel applied to a trigger as compared to the force applied upon or distance the rod moves. A relatively higher thrust ratio provides greater leverage or mechanical advantage which is helpful dispensing sealants with a relatively higher viscosity.

A thrust ratio or ratio may also be considered the distance of trigger movement as compared to the resulting distance of end piece or thrust rod movement. For example, if a three-inch movement of the trigger resulted in a one inch movement of the rod or end piece, the thrust ration would be 3:1. In general thrust ratios for caulking guns are in the range of 3:1 to 28:1. The thrust ratio of a caulking gun may be derived by dividing the distance of trigger travel by the distance the end plate or pressure plate moves as a result of such trigger movement. For example, if a trigger moves 18 mm and the end plate or moves 1 mm, the caulk gun as a thrust ratio of 18:1. As a practical matter, the thrust ratio of a caulking gun can be derived by setting the pressure plate to the starting position, counting the number of trigger pulls for the pressure plate to move to the end position, and dividing the number of trigger pulls by two. In our 18:1 example, 32 trigger pulls would be needed.

A relatively higher thrust ratio requires a greater movement of the trigger as comparted to the resulting movement of the thrust rod. The higher the thrust ratio, the less material is pushed out of the caulking gun per unit of trigger movement. For sealants of a relatively higher viscosity, a caulking gun having a relatively higher thrust ratio is ideal in that the mechanical advantage of the trigger being relatively easier to pull allows the user to work for a longer period of time and to have greater control of the output.

Unfortunately, in using sealants of relatively low viscosity, using a caulking gun with a relatively higher trust ratio will result in a user having too light trigger pull and having to pull the trigger several times to move a small amount of sealant. Therefore, the prior art provides caulking guns of different thrust ratios, requiring a consumer to purchase multiple caulking guns for projects requiring sealants of varying viscosity.

U.S. Pat. No. 6,325,261 Caulking Gun Holder provides a system to attach a caulking gun to a tool belt and to contain drippings from a caulk gun.

U.S. Pat. No. 7,420,341 Power tool and Motor Controller provides an electric motor within a caulking gun but has the disadvantage of extra cost, the bulk of a motor and the need to power the motor.

U.S. Pat. No. 8,387,825 Powered Dispensing Tool and Method for Controlling Same follows the trend in providing motorized caulking guns and adds a microcontroller to address problems inherent with motorized caulking guns.

U.S. Pat. No. 8,424,727 Material Dispensing Assembly adds a drive rack and piston system to convert a portable cartridge dispensing tool or traditional caulk gun into bag type dispensing tool.

All of the known prior art is devoid of means or methods to address the use of caulk having different viscosities in a single hand operated caulking gun. Thus, there is a need in the art for the disclosed embodiments.

BRIEF SUMMARY OF THE INVENTION

The present invention overcomes shortfalls in the related art by presenting an unobvious and unique combination, configuration and use of components to create a self-adjusting variable ratio, sealant dispensing device that self-adjusts the gun's thrust ratio in response to the resistance or viscosity found in the sealant. Thus, when a sealant of relatively high viscosity is placed in a disclosed embodiment, a disclosed embodiment uses a dynamic mechanical system to decrease the relative length of movement of the drive rod without a change to the distance traveled by the trigger, increasing the thrust ratio.

Conversely, when a sealant of relatively low viscosity is placed in a disclosed embodiment, the length of drive rod travel is increased or operates in a default state of a relatively long distance and the trigger distance again remains unchanged. The disclosed embodiments eschew the current trend in the art to use electric motors in dispensing sealants and other materials and the prior art of using separate caulking guns with each caulking gun having different fixed thrust ratio. In other words, the disclosed embodiments vitiate the need for multiple caulking guns of varying thrust ratios or the need for motorized caulking guns.

The disclosed embodiments overcome shortfalls in the art by the novel use of various forms and configurations of components that may include: a variable ratio drive cam, drive cam pivot axle, drive dog, drive cam load spring and other components as described herein. In general, the disclosed embodiments overcome shortfalls in the prior art by providing mechanical means and methods of dynamically adjusting the distance of drive rod movement in direct response to the viscosity of the sealant by the artful use of a variable ratio drive cam or drive cam that pivots in response to the friction encountered by the drive dog and drive rod which in turn alters the distance traveled by the drive rod in response to a trigger pull.

In general, the thrust ratio range is variable and is adjusted by the length/tension of the drive cam load spring as such length/tension increase in proportion to the resistance the drive rod and drive dog experience as a result of the end piece or plunger 35 (see FIG. 5) pushing upon the sealant.

The disclosed embodiments are well suited for use with caulk, construction adhesives and food products. The disclosed embodiments are well suited for a variety of tubes and tube configurations such as single tube, bulk loading tools, sausage tube tools and multi-tube tools.

REFERENCE NUMERALS IN THE DRAWINGS

Figure 3:
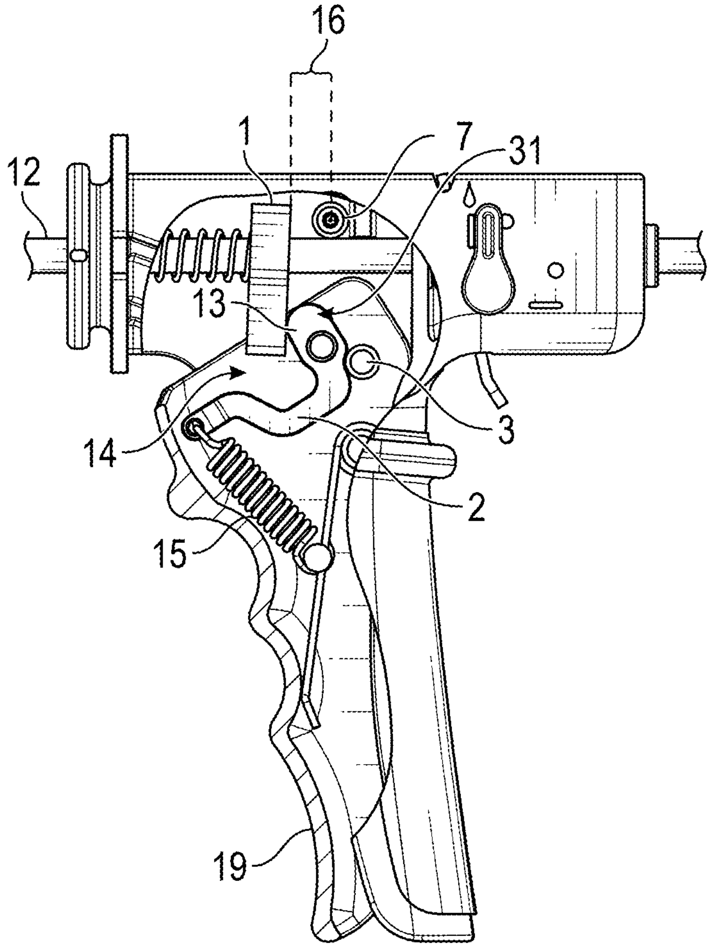
FIG. 3 is a side sectional view of a disclosed embodiment in a low force mode which contemplates the use of sealant with a relatively low viscosity

1 drive dog
2 variable ratio drive cam or drive cam
3 trigger axle
4 handle
5 drive cam load spring
6 drive cam pivot axle
7 drive dog release stop
8 contact point of drive cam to drive dog in a neutral or high force state
9 trigger return spring
10 trigger
11 drive cam spring lower mounting rivet
12 drive rod
13 upper radius portion of the variable ration drive cam shown in contact with the drive dog in FIG. 3, the upper radius also located above the drive cam pivot cam 8
14 drive cam shown following the trigger with cam load spring not being extended due to the low force on the drive rod 12
15 load spring shown in the "low force" mode
16 distance the drive dog 1 moves with one trigger actuation in "Low Force" mode
19 trigger in an actuated position
21 distance drive dog 1 moves with one trigger actuation in "High Force" mode
23 contact point between drive cam and drive dog in "High Force" mode
24 load spring fully extended in the "High Force" mode
25 trigger in an actuated position
29 drive dog/drive rod spring
30 distal end of variable ratio drive cam connected to drive cam load spring 5
31 component configuration wherein the contact point between a variable ratio drive cam 2 and drive dog 1 in the "Low Force" mode
35 end piece, plunger or pressure plate
40 optional frame to retain a caulking cartridge These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Figure 1:
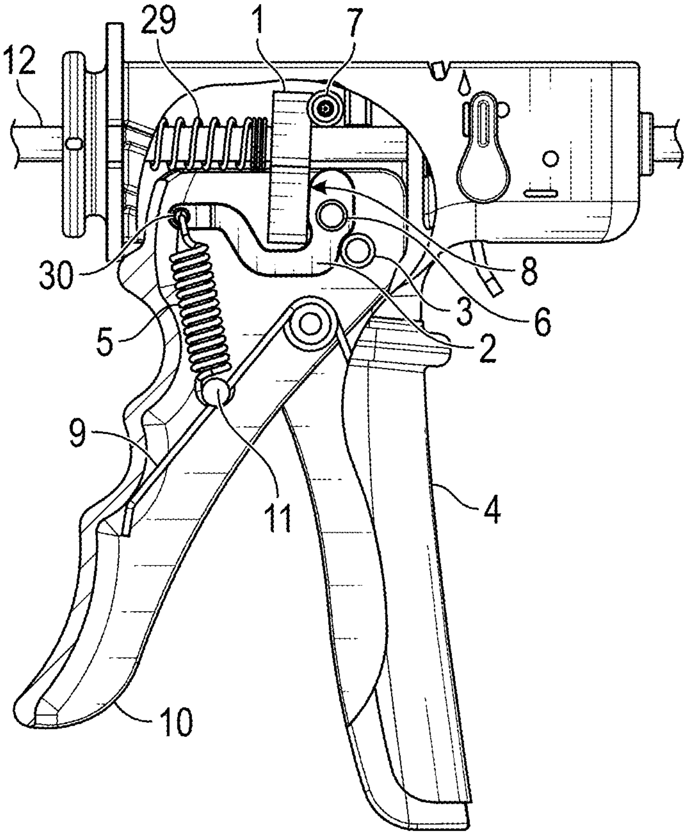
FIG. 1 is a side sectional view of a disclosed embodiment in neutral mode
Figure 2:
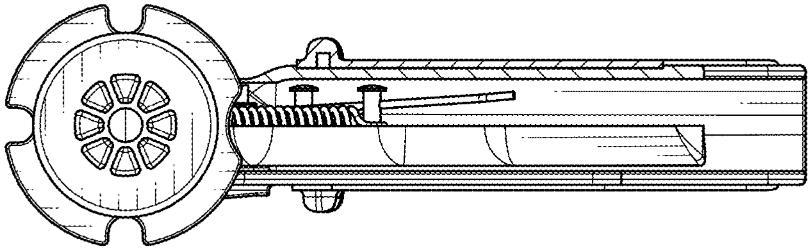
FIG. 2 is a front sectional view of a disclosed embodiment

Referring to FIG. 1, a disclosed embodiment is shown in neutral mode wherein no pressure in being applied to a tube or other workpiece. A drive dog 1 is shown in relatively close proximity or resting upon a drive dog release stop 7. A mid, medial section or flat section of a variable ration drive cam 2 is shown in contact with the proximal side of the drive dog 1.

The trigger return spring 9 may have a first end attached to the trigger with an opposite end and a second end attached to the handle or frame of the gun. The first end of the trigger return spring may intersect, be attached to or travel through the drive cam spring lower mounting rivet to gain a mechanical advantage of being directly connected to the second end or lower end of the drive cam load spring 5. The direct connection increases the return force of the trigger return spring and also more securely attaches the lower end of the drive cam load spring to more efficiently rotate the variable ratio drive cam.

Referring to FIG. 3, a disclosed embodiment is shown in a relative "low force" state wherein a tube of sealant or other product has a relatively low viscosity and thus requires relatively less force to apply. The trigger is in an actuated position with a low force being applied. The force is too low to extend the load spring so the drive cam stays in the low force position and the load spring is shown in a contracted state 15. The upper radius 13 or upper portion of the drive cam is shown in contact with the drive dog 1 which results in a relatively longer movement of the drive rod. The resulting distance is shown as the distance 16 between the drive dog 1 and drive dog release stop 7. This relatively greater distance results in a relatively lower thrust ratio that may be in the relatively lower range of 3:1 to 16:1.

Figure 4:
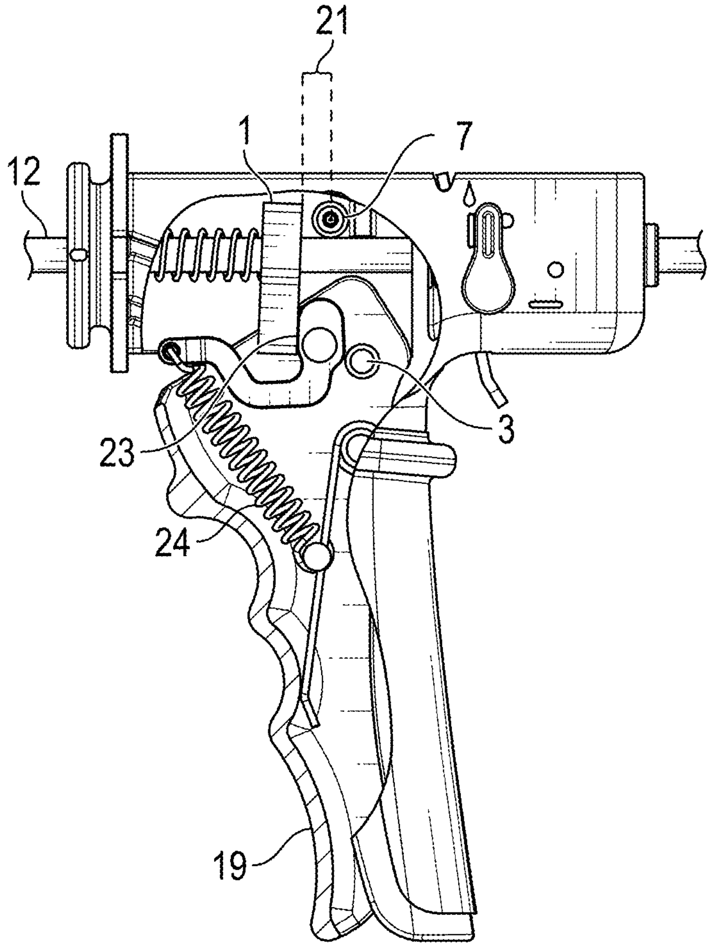
FIG. 4 is a side sectional view of a disclosed embodiment in a high force mode which contemplates the use of sealant with a relatively low viscosity

The drive cam 2 or may comprise a proximal end or end near a user with the proximal end comprising an oblong portion such as the relatively flat portion shown in contact with the drive dog in FIG. 1 and FIG. 4, the flat portion may transition upwardly into a radius or rounded portion such as the portion shown in contact with the drive dog in FIG. 3. The proximal portion of the drive cam may be pivotally connected to the handle assembly by use of a drive cam pivot axel 6.

The drive cam 2 may further comprise a middle section taking the form of a "U" shape so as to be positioned below the drive dog but yet allow the drive dog to by near or touching the radius for an efficiency of movement and conservation of space within the frame of the disclosed embodiment. A distal or far section of the drive cam may take an upward angle so as to be generally in the same plane as the drive cam pivot axel and may define a void to accept the superior end of the drive cam loading spring.

The "U" shape of the drive cam overcomes shortfalls in the related art and/or provides a unique mechanical advantage by allowing the drive rod to move at a greater distance by getting out the way of the drive dog in a low force mode FIG. 3 and by having an initial starting point for the upper end of the drive cam loading spring to be near the same plane as the drive cam pivot axel.

The "U" shape of the drive cam further overcomes shortfalls in the related art and/or provides a unique mechanical advantage in that the relative level of the upper end of the drive cam loading spring remains relatively near the same plane as the drive cam pivot axel so as to move the drive rod a relatively shorter distance in a high force mode as shown in FIG. 4.

The use of a drive dog in contact or in constant contact with some portion of the oblong portion or upper radius portion of the drive cam in either a low force or high force mode, overcomes shortfalls in the related art and/or provides a unique mechanical advantage in that resistance encountered by the drive rod, as a result of sealant viscosity, is transmitted to the drive cam load spring which in turn is transmitted to the drive cam spring lower mounting rivet 11 with the lower mounting rivet attached the trigger such that the user's effort in using the trigger during use is efficiently used to adjust the distance of drive rod movement by the resulting pivotal movement of the drive cam.

However, the thrust ratio range is variable and is adjusted by the length/tension of the drive cam load spring as such length/tension increase in proportion to the resistance the drive rod and drive dog experience as a result of the end piece or plunger 35 (see FIG. 5) pushing upon the sealant.

FIG. 4 shows a disclosed embodiment in a state of "high force" as a result of the end piece or plunger pushing against a sealant of relatively high resistance or high viscosity. As a result, the load spring is shown in a state of expansion 24 as the trigger pull expands the load spring as the load cam fails to easily move the drive dog. Thus, the point of contact 23 between the drive dog and drive cam is in the middle or medial portion lower radius of the drive cam, resulting in a relatively shorter movement of the drive rod. This relatively shorter movement increases the relative thrust ratio. The shorter movement or shorter distance can be seen in distance 21 between the drive dog and drive dog release stop. This relatively shorter drive rod distance increases the thrust ratio to the approximate range of 17:1 to 32:1.

Figure 5:
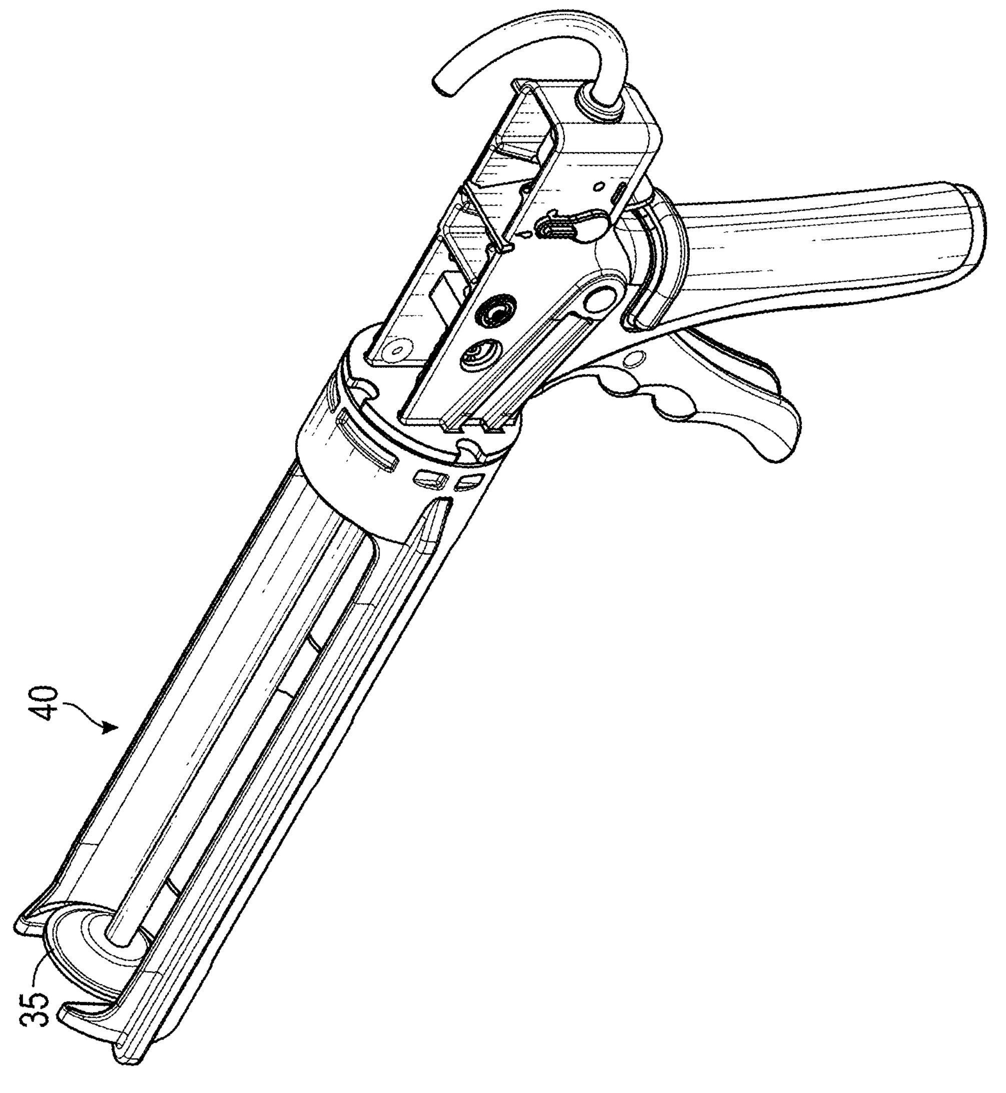
FIG. 5 is a perspective view of a disclosed embodiment
Figure 6:
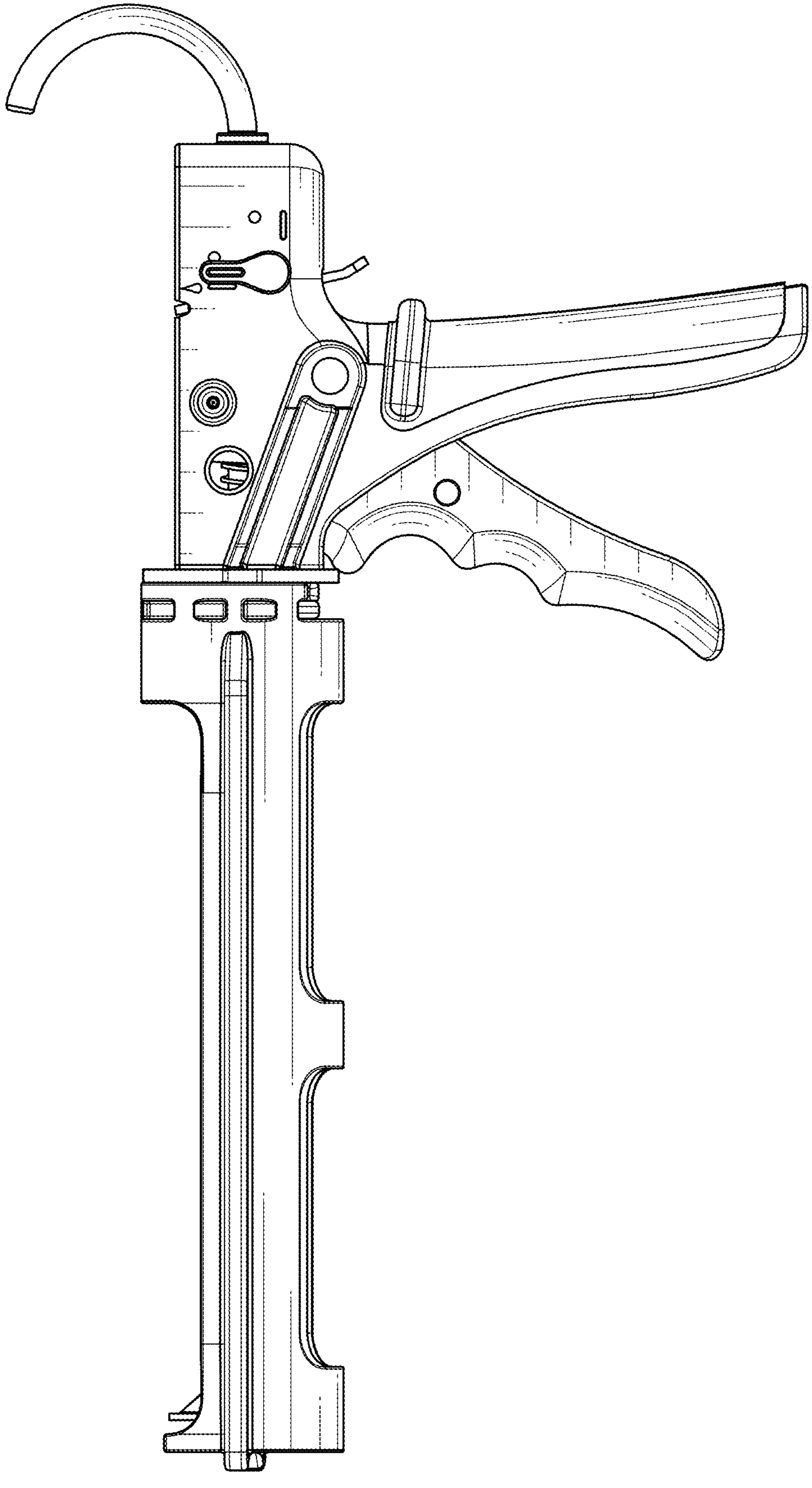
FIG. 6 is a side view of a disclosed embodiment

FIG. 5 shows a disclosed embodiment attached to a tube holder frame and other components to create a caulking gun. Other configurations are contemplated The terms "spring", "elastic member" and "resilient member" refer to any component capable of expansion and having a bias to return their original condition.

The term "payload" refers to any substance used by a disclosed embodiment which may include caulk, construction materials, food stuffs and any material that may be dispensed by force.

The term "tool piece frame" refers to a frame supporting or attached to any of the components of a disclosed embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A variable thrust ratio tool for pushing a substance and adapting a thrust ratio in response to a viscosity of the substance, the tool comprising:

a. a frame with a handle;

b. a trigger pivotally attached to the handle, and the trigger includes a drive cam lower mount rivet;

c. a drive rod disposed within the frame and above the trigger, the drive rod slidably attached to a drive dog;

d. a variable ratio drive cam is an integral structure including a camming surface portion, a middle portion, and a distal end portion, wherein the variable ratio drive cam is pivotally attached to the trigger by a drive cam pivot axle, wherein the drive cam pivot axle is disposed below the drive rod and to a rear side of the drive dog, and wherein the camming surface portion is in direct contact with the rear side face of the drive dog and configured to actuate the drive dog during operation, the middle portion is disposed below the drive dog and connects the camming surface portion to the distal end portion, and the distal end portion disposed in front of the drive dog;

e. an elastic member having a first end attached to the distal end portion of the variable ratio drive cam and the elastic member having a second end attached to the drive cam lower mount rivet;

f. a trigger return spring having a first end attached to the trigger and the trigger return spring having a second end attached to the handle; and g. a portion of the first end of the trigger return spring is in contact with the drive cam spring lower mount rivet, such that the trigger return spring gains a mechanical advantage of additional biasing force of the elastic member when operated.

2. The tool of claim 1 wherein the trigger is pivotally attached to the frame.

3. The tool of claim 1 wherein a trigger axle pivotally attaches the trigger to the handle.

4. The tool of claim 1 further including a drive dog release stop disposed to the rear of the drive dog.

5. The tool of claim 1 wherein the variable ratio drive cam comprises a relatively flat section sometimes used to apply force to the drive dog.

6. The tool of claim 5 wherein the variable ratio drive cam further comprises a radius section disposed above the flat section.

7. The tool of claim 6 wherein the radius section of the variable ratio drive sometimes urges the drive dog forward in order to increase the distance travelled by the drive rod in response to a pull of the trigger.

8. The tool of claim 1 wherein the middle portion of the variable ratio drive cam takes the form of a "U".

9. The tool of claim 1 wherein the drive cam pivot axle is pivotally attached through a proximal side of the variable ratio drive cam.

* * * * *